(12) United States Patent
Housel

(10) Patent No.: US 6,954,801 B1
(45) Date of Patent: Oct. 11, 2005

(54) METHOD AND SYSTEM FOR REDUCING DATA VOLUME TRANSFERRED OVER A WIRELESS COMMUNICATIONS NETWORK

(75) Inventor: Barron C. Housel, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 844 days.

(21) Appl. No.: 10/010,290

(22) Filed: Nov. 30, 2001

(51) Int. Cl.[7] ............................................. G06F 15/16
(52) U.S. Cl. ...................... 709/247; 709/203; 709/205; 709/217; 709/218; 709/219; 709/224; 707/10; 707/103 Y; 713/200
(58) Field of Search .............................. 709/203, 205, 709/217, 218, 219, 224, 247; 707/10, 103 Y; 713/200

(56) References Cited

U.S. PATENT DOCUMENTS 6,032,197 A * 2/2000 Birdwell et al. ............ 709/247
6,122,637 A * 9/2000 Yohe et al. ............. 707/103 Y
6,618,397 B1 * 9/2003 Huang ......................... 370/474
6,775,687 B1 * 8/2004 Binding et al. ............. 709/203

* cited by examiner

Primary Examiner—Saleh Najjar
Assistant Examiner—Yves Dalencourt
(74) Attorney, Agent, or Firm—Baker Botts L.L.P.

(57) ABSTRACT

A system for reducing data volume transferred over a wireless communications network includes a browser operable to communicate a sequence to a network interface. The system further includes the network interface operable to receive the sequence from the browser, generate a signature for the sequence, store the sequence and signature in memory, associate the sequence and signature with the browser, communicate a cache header and the signature to the browser, and communicate at least one request header to a server. The browser, upon sending a subsequent communication to the server, communicates the cache header and signature to the network interface. In this manner HTTP request headers need not be transferred for every request from the browser.

32 Claims, 2 Drawing Sheets

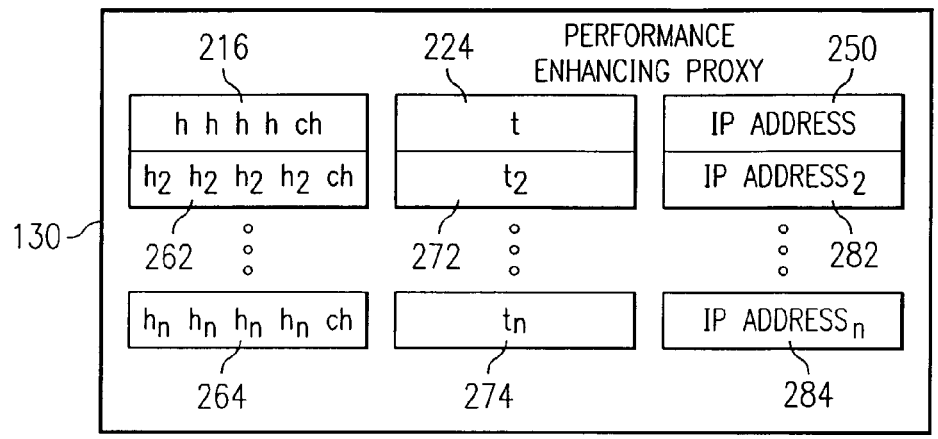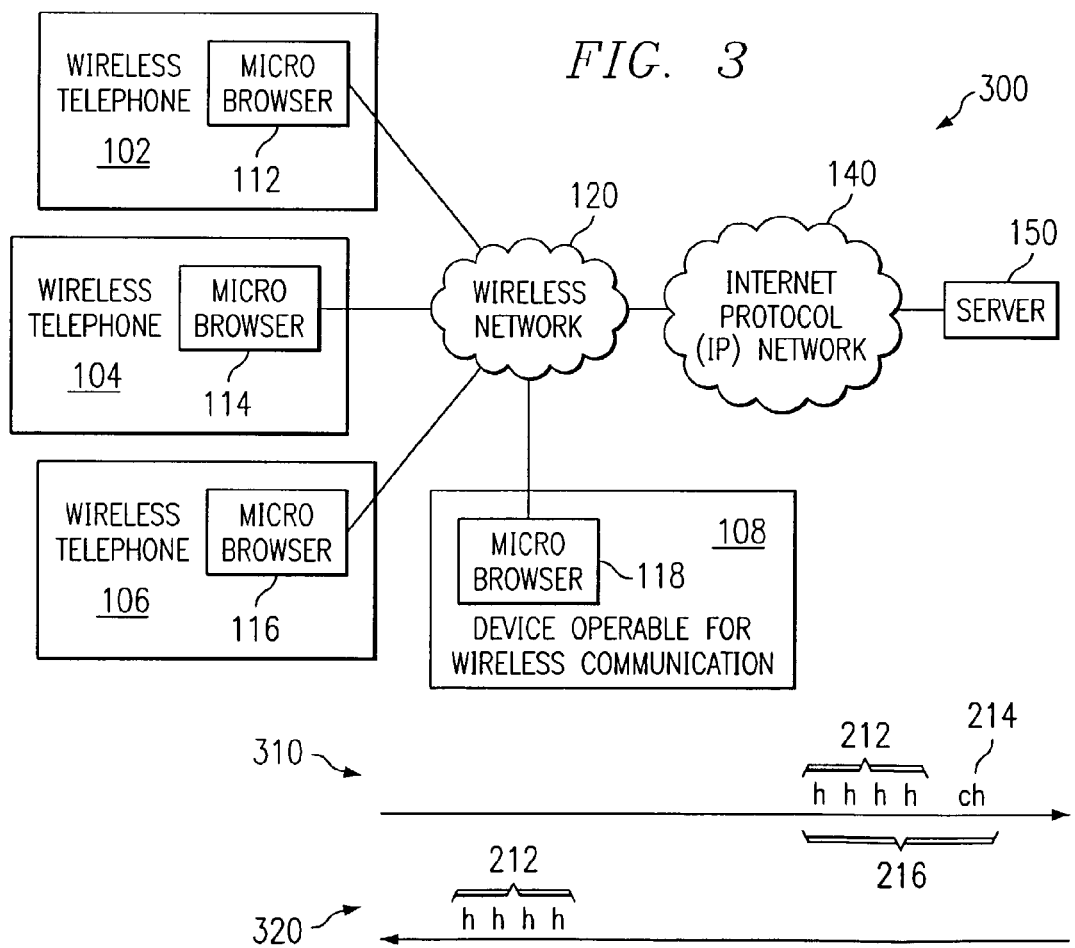

METHOD AND SYSTEM FOR REDUCING DATA VOLUME TRANSFERRED OVER A WIRELESS COMMUNICATIONS NETWORK

TECHNICAL FIELD OF THE INVENTION

The present invention relates in general to communications in wide area wireless environments and more particularly to a method and system for reducing data volume transferred over a wireless communications network.

BACKGROUND OF THE INVENTION

The capabilities of wireless media communication systems are dictated to a large extent by the bandwidth available to deliver information between a browser and a server. Particularly in wide area wireless environments where bandwidth is limited, utilization of the radio network and user response times can be improved by reducing data volume over the wireless media network.

"Micro" Internet browsers such as those currently available on wireless telephones execute Hypertext Transfer Protocol (HTTP) to access web servers. To facilitate such communication requires that identification and capability information be communicated between the browser and web server. Typically, HTTP headers sent by the browser consist of lengthy strings of American Standard Code for Information Interchange (ASCII) text. These headers rarely change because they disclose non-changing attributes of the device. Therefore, it is desirable to reduce data volume over the wireless media network by reducing the volume of HTTP headers required during communication sessions between the browser and web server.

SUMMARY OF THE INVENTION

From the foregoing, it may be appreciated by those skilled in the art that a need has arisen for a method to reduce the amount of header data volume sent over a wireless communications network. In accordance with the present invention, a method and system for reducing data volume transferred over a wireless communications network are provided that substantially eliminate or greatly reduce disadvantages and problems associated with conventional wireless communications network data transfer techniques.

According to an embodiment of the present invention, there is provided a system for reducing data volume transferred over a wireless communications network that includes a browser operable to communicate a sequence to a network interface. The network interface is operable to receive the sequence from the browser, generate a signature for the sequence, store the sequence and signature in memory, associate the sequence and signature with the browser, communicate a cached header to the browser, and communicate at least one request header to a server. The browser, upon sending a subsequent communication to the server, is further operable to communicate the cache header and the signature to the network interface.

The present invention provides various technical advantages over conventional wireless communications network data transfer techniques. For example, one technical advantage is an increased efficiency of wireless network utilization without negative impact on service as perceived by the browser user. Another technical advantage is a decrease in the response time necessary to fulfill a browser request by minimizing HTTP header traffic between the browser and the Performance Enhancing Proxy (PEP). Yet another technical advantage is that the method requires no changes to HTTP, thereby implementing header compression in a way that is non-disruptive to nodes that cannot support the option. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 2B illustrates a simplified block diagram of memory locations within the Performance Enhancing Proxy (PEP); and FIG. 3 illustrates a simplified diagram of a wireless communications network in operation without a Performance Enhancing Proxy (PEP).

DETAILED DESCRIPTION OF THE INVENTION

Figure 1:
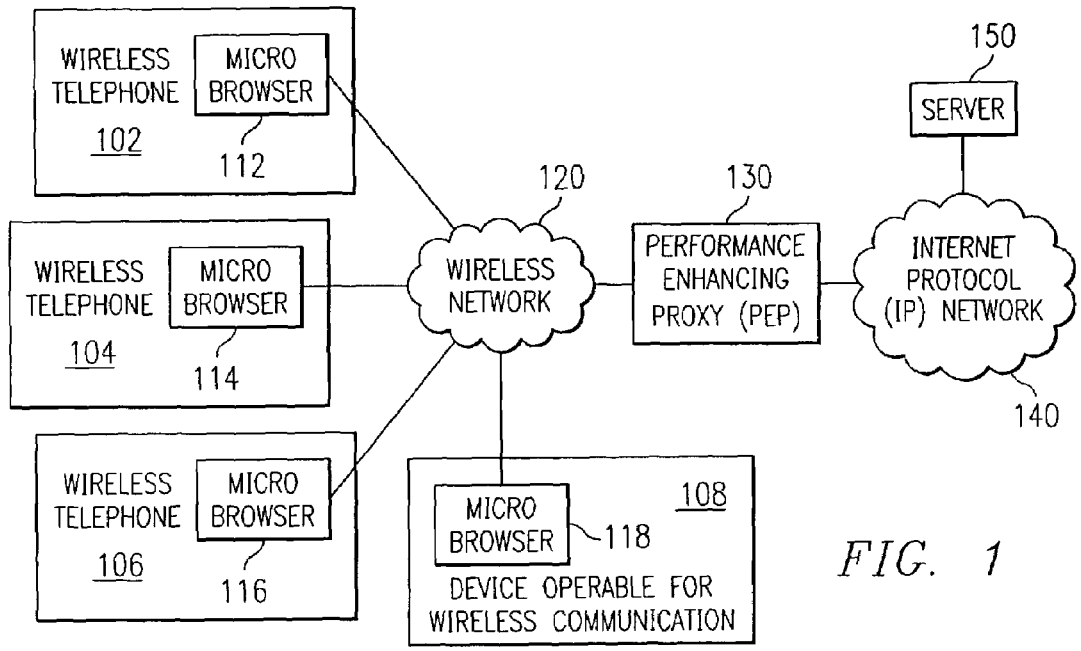
FIG. 1 illustrates a simplified diagram of a wireless communications network environment.

Referring to FIG. 1, there is illustrated a diagram of a wireless communications network environment 100. Network environment 100 is comprised of a plurality of devices operable for wireless communication. While the claimed invention will be described in detail for implementation in wireless communications network 100, the present invention may also function with all forms of Internet Protocol (IP) networks.

In a preferred embodiment of the present invention, mobile device 102, mobile device 104, and mobile device 106 are associated with Internet "micro" browsers 112, 114, 116, respectively. Mobile devices 102, 104, and 106 may be wireless telephones or other wireless communication devices. Additional devices operable for wireless communication are represented by device 108, which is associated with "micro" browser 118. Device 108 might be a Personal Digital Assistant (PDA) or any other Internet-ready wireless device. Internet "micro" browsers may be distinguished from among other Internet browsers in that the "micro" browsers typically offer a more limited capability set than an Internet browser operating on a personal computer. For example a "micro" browser may not be able to support high-resolution graphics, Java-script, or other information formats beyond text files. As wireless communication technology advances, however, the distinction between Internet browsers and "micro" browsers is expected to diminish. While the present invention will be described in detail for implementation among Internet "micro" browsers, the present invention may also function with all types of Internet browsers.

When a user of wireless telephone 102 desires to send or receive information via the Internet "micro" browser 112, browser 112 is operable to communicate over a wireless network 120 to a server 150. An Internet Protocol (IP) network interface 130 is located in network 100 between wireless network 120 and server 150. In a preferred embodiment of the present invention, the IP network interface 130 comprises a Performance Enhancing Proxy (PEP) 130. The PEP 130 is operable to communicate over Internet Protocol (IP) network 140 using a Hypertext Transfer Protocol (HTTP) with server 150 with which browser 112 wishes to exchange information. PEP 130 could exist as a separate device or as part of any product that serves as an HTTP proxy. Examples of such HTTP proxies include, but are not limited to, cache engines, content switches, and firewalls.

Figure 2A:
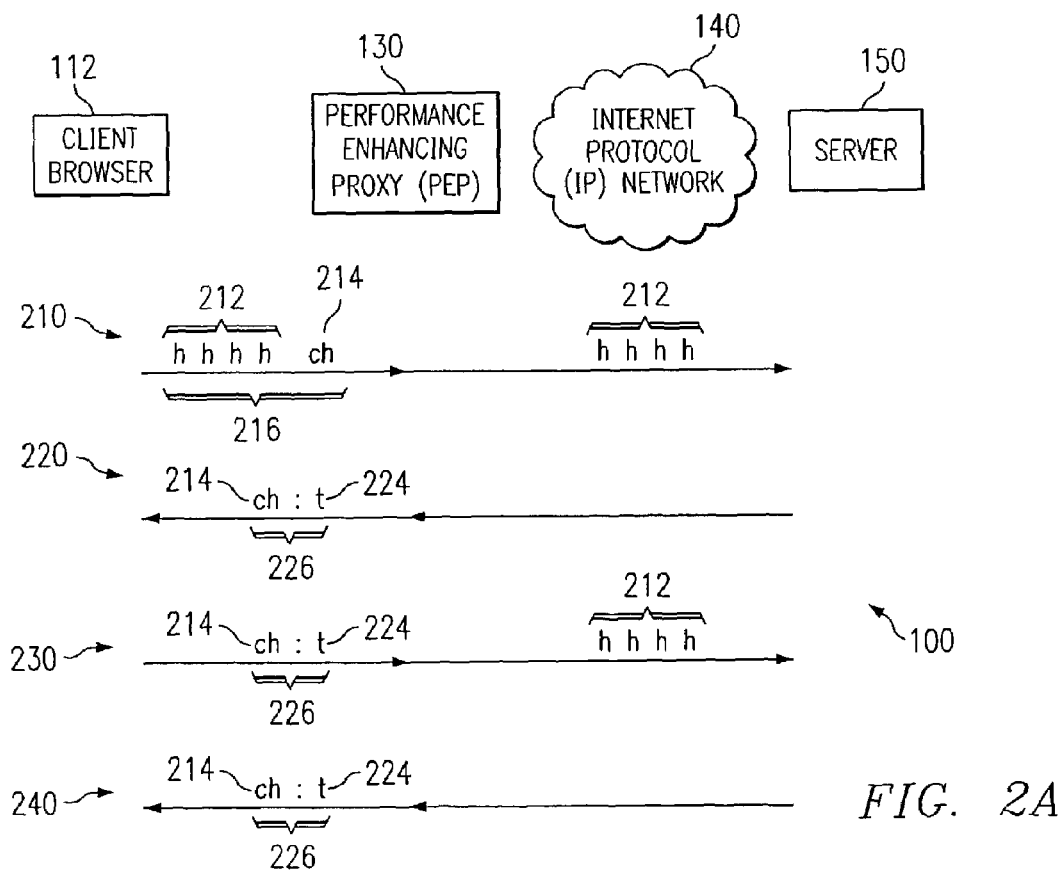
FIG. 2A illustrates a simplified communications scheme of a Performance Enhancing Proxy (PEP) in the wireless communications network environment.

Referring to FIG. 2A, there is illustrated a simplified communications scheme including PEP 130 in wireless communications network environment 100. Internet Protocol network 140 permits the transfer of information between browser 112 and server 150. Browser 112 initiates a data transfer from server 150 by communicating a request to server 150. The request is preceded by a sequence of Hypertext Transfer Protocol (HTTP) request headers 212. HTTP defines how messages are formatted and transmitted and determines what actions browser 112 or server 150 will take in response to various commands. HTTP request headers 212 are typically character strings in American Standard Code for Information Interchange (ASCII) format. HTTP request headers 212 describe characteristics of the device requesting the information. Some exemplary characteristics include the browser type, capabilities of the display, as well as headers regarding particular architecture formats. Depending on the capabilities of the particular device making the request, the size of HTTP request headers 212 can often consume 100 to 200 bytes of data that must be transmitted back and forth between browser 112 and server 150 for every data transfer. HTTP request headers 212 remain fairly constant for a particular device as they typically capture non-changing attributes of the device.

Path 210 represents a request for information by browser 112 that is communicated to PEP 130. PEP 130 communicates the request for information to server 150 over Internet Protocol network 140 with which browser 112 wishes to exchange information. In a preferred embodiment of the claimed invention, browser 112 precedes a data request with HTTP request headers 212. In addition to HTTP request headers 212, browser 112 also communicates cache header 214 to utilize a HTTP header compression as part of HTTP request header sequence 216.

When PEP 130 is located between browser 112 and server 150 in network environment 100, it is possible to compress HTTP request headers 212 between browser 112 and PEP 130 over wireless network 120. PEP 130 reconstitutes HTTP request headers 212 to their original form before the HTTP request headers 212 are forwarded by PEP 130 to server 150. Referring now to FIG. 2B, there is illustrated a simplified block diagram of cache memory locations within PEP 130. When PEP 130 receives HTTP request header sequence 216 from browser 112 that includes cache header 214 to utilize HTTP header compression, PEP 130 generates a signature 224 for HTTP request header sequence 216 and caches HTTP request header sequence 216 and signature 224 in PEP memory. PEP 130 is further operable to associate HTTP request header sequence 216 and signature 224 with Internet Protocol (IP) address 250 of browser 112. IP address 250 is an identifier for a device such as browser 112 on IP network 140, and, at any one time, IP address 250 for browser 112 uniquely identifies browser 112 by its location on IP network 140.

PEP 130 is operable to perform HTTP header compression for a plurality of wireless devices. A second device such as mobile device 104 can communicate a HTTP request header sequence 262 to PEP 130, and HTTP request header sequence 262 is stored in cache memory of PEP 130. PEP 130 generates a signature 272 for mobile device 104. HTTP request header sequence 262 and signature 272 are then associated with an IP address 282 of mobile device 104. PEP 130 may store a HTTP request header sequence 264 and signature 274 for each additional device and associate HTTP request header sequence 264 and signature 274 with the IP address 284 of the device.

Identical devices may generate identical HTTP request header sequences 216. For example wireless telephones of the same brand and model could each precede data exchange requests with the same HTTP request header sequence 216. In such circumstances PEP 130 would only need to cache HTTP request header sequence 216 one time by associating HTTP request header sequence 216 with a plurality of individual signatures representing each of the devices that utilize the same HTTP request header sequence 216. In this manner, the cache memory efficiency of PEP 130 may be increased. When HTTP request header sequence 216 is associated with a plurality of signatures, only signature 224 or some other memory pointer reference need be associated with an individual browser IP address 250.

Upon receiving HTTP request header sequence 216 from browser 112, PEP 130 communicates HTTP request headers 212 across IP network 140 to server 150. This transmission is illustrated at the right side of path 210. When PEP 130 receives the information response from server 150, PEP 130 determines whether or not browser 112 participates in header compression. PEP 130 determines if there is a HTTP request header sequence 216 and signature 224 associated with IP address 250 of browser 112 stored in the cache memory of PEP 130. If there is, PEP 130 communicates the response that includes cached header 214 and signature 224 (collectively referred to as a compressed response 226) to browser 112 in addition to the data retrieved from server 150. This transmission is illustrated at a path 220. When browser 112 receives compressed response 226 from PEP 130, browser 112 caches compressed response 226 if compressed response 226 is not already cached in the memory of browser 112.

When a user commands browser 112 to issue a new request for data exchange, browser 112 determines whether or not it has cached compressed response 226. If compressed response 226 has already been cached by browser 112, browser 112 generates compressed response 226 as the only request header sent to PEP 130. This transmission is illustrated at a path 230. When PEP 130 receives compressed response 226 from browser 112, PEP 130 determines if cached signature 224 matches the signature portion of compressed response 226. If the signatures are identical, PEP 130 locates the HTTP request header sequence 216 associated with IP address 250 of browser 112 stored in the cache memory of PEP 130 and generates HTTP request headers 212 for communication to server 150. This transmission is illustrated at the right side of path 230.

If, however, PEP 130 determines that browser 112 does participate in header compression but the signatures do not match or compressed response 226 does not exist in the cache memory of PEP 130, then PEP 130 responds to the request for data exchange from browser 112 with a HTTP Error 406 ("Not Acceptable" or "Not Acknowledged") message. In addition to the Error message 406, a cache header 214 to utilize HTTP header compression with no attached signature 224 is generated and communicated by PEP 130 to browser 112. Browser 112 will respond to PEP 130 by communicating its data exchange request with HTTP request headers 212 and cache header 214 to utilize HTTP header compression to re-establish storage of compressed response 226 in the cache memory of PEP 130. PEP 130 might not have a cached HTTP request header sequence 216 for browser 112 if PEP 130 were to experience a power outage or if PEP 130 were recycled. The occurrence of either of which might result in a loss of data stored in the cache memory of PEP 130.

Referring to FIG. 3, there is illustrated a simplified diagram of wireless communications network 300 in operation without PEP 130. Without PEP 130, a request for data exchange from mobile device 102 is communicated by wireless network 120 directly to IP network 140 and on to server 150. As depicted at path 310, mobile device 102 will format its data request to include HTTP request headers 212 and cache header 214 as part of request header sequence 216. Without PEP 130 in network 300, however, cache header 214 will be disregarded by server 150. When a device receives an HTTP header that the device is unable to understand, the header is merely disregarded and passed along with the rest of the communication. As is shown at a path 320, when server 150 receives cache header 214 to utilize HTTP header compression, it disregards cache header 214 and responds only to the request for data exchange from browser 112. Server 150 communicates HTTP request headers 212 and the requested data to the browser 112. The method of header compression of the claimed invention is thus shown to be non-disruptive to nodes that cannot support the option to compress HTTP headers. When browser 112 requests header compression but no PEP 130 is present to perform the compression, data exchange continues normally but without HTTP header compression. The HTTP header compression method is thus seen to be "transparent."

Thus, it is apparent that there has been provided, in accordance with the present invention, a method and system for reducing data volume transferred over a wireless communications network that satisfies the advantages set forth above. Although the present invention has been described in detail, it should be understood that various changes, substitutions, and alterations may be made herein. Though discussed with respect to a wireless environment, the present invention may equally apply to other communications media to include fiber optic links and wire line techniques. Moreover, although discussed in terms of HTTP requests, the present invention may be equally implemented in any system that provides redundant header information with any type of request. Other examples may be readily ascertainable by those skilled in the art and may be made herein without departing from the spirit and scope of the present invention as defined by the following claims.

What is claimed is:

1. A system for reducing data volume transferred over a wireless communications network, comprising:
 a browser operable to communicate a header sequence with a request to a network interface;
 the network interface operable to receive the header sequence from the browser, the network interface operable to generate a signature for the header sequence, the network interface operable to store the sequence and signature in memory, the network interface operable to associate the sequence and signature with the browser, the network interface operable to communicate a cache header and the signature to the browser, network interface operable to communicate at least one request header of the header sequence to a server;
 the browser, upon sending a subsequent communication, communicates the cache header and the signature to the network interface, in place of the header sequence.

2. The system of claim 1, wherein the sequence comprises request header information and a cache header to utilize header compression.

3. The system of claim 2, wherein the sequence further comprises at least one Hypertext Transfer Protocol (HTTP) request header and a cache header to utilize HTTP header compression.

4. The system of claim 1, wherein the browser is operable to store the sequence and signature in memory.

5. The system of claim 1, wherein the network interface is operable to associate the sequence and signature with an Internet Protocol (IP) address for the browser.

6. The system of claim 1, wherein the network interface is operable to communicate the at least one request header to a server over an IP network.

7. The system of claim 1, wherein the network interface is operable to receive a response from the server and determine whether the network interface has stored a sequence and signature in memory associated with the browser.

8. The system of claim 7, wherein the network interface, upon determining that there is a sequence and signature stored in memory and associated with the browser, is operable to replace the head sequence received from the server with the cache header and signature, the network interface operable to communicate the cache header, signature, and response to the browser.

9. The system of claim 8, wherein the browser, upon receiving the cache header, signature, and response from the network interface, is operable to store the cache header and signature in memory if the browser has not already done so.

10. The system of claim 1, wherein the browser, upon initiating a communication when the browser has previously stored the cache header and signature in memory, communicates the cache header and signature to the network interface.

11. The system of claim 10, wherein the network interface, upon receiving the cache header and signature from the browser, determines if the cache header and signature are stored in memory and are associated with the IP address of the browser, generates the at least one request header if the cache header and signature match the cache header and signature stored in memory, and communicates at least one request header to the server over the IP network.

12. The system of claim 11, wherein the network interface, upon receiving a response from the server, replaces at least one request header received from the server with the cache header and signature and communicates the cache header, signature, and response to the browser.

13. The system of claim 9, wherein the browser, upon receiving the cache header, signature, and response from the network interface, compares the cache header and signature against the cache header and signature stored in memory and deletes the cache header and signature stored in memory if it does not match the cache header and signature received from the network interface.

14. The system of claim 10, wherein the network interface, upon receiving the cache header and signature but unable to locate a cache header and signature stored in memory associated with the IP address of the browser, generates an error message and communicates the error message and cache header to the browser.

15. The system of claim 14, wherein the error message is a HTTP Error 406 ("Not Acceptable" or "Not Acknowledged").

16. The system of claim 14, wherein the browser, upon receiving the error message and cache header from the network interface, communicates the header sequence to the network interface to re-establish the cache header and signature stored in network interface memory.

17. A device for reducing data volume transferred over a wireless communications network, comprising:
a network interface operable to receive a header sequence from a browser, the network interface operable to generate a signature for the header sequence, the network interface operable to store the sequence and signature in memory, the network interface operable to associate the header sequence and signature with the browser, the network interface operable to communicate a cache header and the signature to the browser, the network interface operable to communicate at least one request header to a server over an IP network, wherein the network interface is operable to receive a subsequent communication from the browser that includes the cache header and the signature in place of the header sequence.

18. The device of claim 17, wherein the network interface is operable to receive a header sequence comprised of header information and a cache header to utilize header compression.

19. The device of claim 18, wherein the network interface is further operable to receive a header sequence further comprised of at least one Hypertext Transfer Protocol (HTTP) request header and a cache header to utilize HTTP header compression.

20. The device of claim 17, wherein the network interface associates the header sequence and signature with an Internet Protocol (IP) address for the browser.

21. A method for reducing data volume transferred over a wireless communications network, comprising:
receiving a header sequence from a browser;
generating a signature for the header sequence;
storing the header sequence and signature in memory;
associating the header sequence and signature with the browser;
communicating a cache header and the signature to the browser;
communicating at least one request header of the header sequence to a server;
and receiving a subsequent communication from the browser that includes the cache header and the signature in place of the header sequence.

22. The method of claim 21, wherein the header sequence comprises header information and a cache header to utilize header compression.

23. The method of claim 22, wherein the header sequence further comprises at least one Hypertext Transfer Protocol (HTTP) request header and a cache header to utilize HTTP header compression.

24. The method of claim 21, wherein the network interface associates the header sequence and signature with an Internet Protocol (IP) address for the browser.

25. The method of claim 21, further comprising:
receiving a response from the server and determining whether the network interface has stored a header sequence and signature in memory associated with the browser.

26. The method of claim 25, further comprising:
upon determining that there is a header sequence and signature stored in memory and associated with the browser, replacing at least one request header received in the response from the server with the cache header and signature, and communicating the cache header, signature, and response to the browser.

27. A system for reducing data volume transferred over a wireless communications network, comprising:
means for receiving a header sequence from a browser;
means for generating a signature for the header sequence;
means for storing the header sequence and signature in memory;
means for associating the header sequence and signature with the browser;
means for communicating a cache header and the signature to the browser;
means for communicating at least one request header of the header sequence to a server;
and means for receiving a subsequent communication from the browser that includes the cache header and the signature in place of the header sequence.

28. The system of claim 27, further comprising:
means for receiving a response from the server;
means for determining whether the network interface has stored a header sequence and signature in memory associated with the browser; and
upon determining that there is a header sequence and signature stored in memory and associated with the browser, means for replacing at least one request header received in the response from the server with the cache header and signature, and means for communicating the cache header, signature, and response to the browser.

29. Header compression software embodied in a computer-readable medium and operable to:
receive a header sequence from a browser;
generate a signature for the header sequence;
store the header sequence and signature in memory;
associate the header sequence and signature with the browser;
communicate a cache header and the signature to the browser;
communicate at least one request header to a server;
and receive a subsequent communication from the browser that includes the cache header and the signature in place of the header sequence.

30. The software of claim 29, further comprising associating the header sequence and signature with an Internet Protocol (IP) address for the browser.

31. The software of claim 30, further comprising:
receiving a response from the server and determining whether the network interface has stored a header sequence and signature in memory associated with the browser.

32. The software of claim 31, further comprising:
upon determining that there is a header sequence and signature stored in memory and associated with the browser, replacing at least one request header received in the response from the server with the cache header and signature, and communicating the cache header, signature, and response to the browser.

* * * * *